United States Patent [19]

Ichiyanagi

[11] Patent Number: 4,570,188
[45] Date of Patent: Feb. 11, 1986

[54] STILL VIDEO CAMERAS

[75] Inventor: Toshikazu Ichiyanagi, Tokyo, Japan

[73] Assignee: Canon Kabushiki Kaisha, Japan

[21] Appl. No.: 715,036

[22] Filed: Mar. 21, 1985

Related U.S. Application Data

[63] Continuation of Ser. No. 409,860, Aug. 20, 1982, abandoned.

[30] Foreign Application Priority Data

Sep. 21, 1981 [JP] Japan .................................. 56-149055

[51] Int. Cl.$^4$ ............................................. H04N 5/76
[52] U.S. Cl. ................................... 358/335; 340/671;
358/906; 360/31; 360/73; 360/35.1; 369/53
[58] Field of Search ............... 358/335, 906; 360/69,
360/71, 31, 73, 35.1; 369/53; 340/671

[56] References Cited

U.S. PATENT DOCUMENTS

| | | | |
|---|---|---|---|
| 4,085,698 | 4/1978 | Kajino et al. | 340/671 |
| 4,368,490 | 1/1983 | Takimoto | 358/906 X |
| 4,386,376 | 5/1983 | Takimoto et al. | 358/335 |
| 4,447,837 | 5/1984 | Hirata et al. | 358/906 X |

*Primary Examiner*—Robert L. Richardson
*Attorney, Agent, or Firm*—Toren, McGeady, Stanger, Goldberg & Kiel

[57] ABSTRACT

A still video camera in which the image of an object formed on a photoelectric conversion surface by a picture-taking lens is scanned to generate video signals, which are recorded on a magnetic disc rotating at a predetermined speed. An indication lamp is provided in a finder and is turned on by the first stroke of a trigger member which starts rotation of the magnetic disc which is turned off by a control apparatus when rotation of the disc has reached a predetermined speed indicating the appropriate time for the second stroke of the trigger member which starts recording.

26 Claims, 4 Drawing Figures

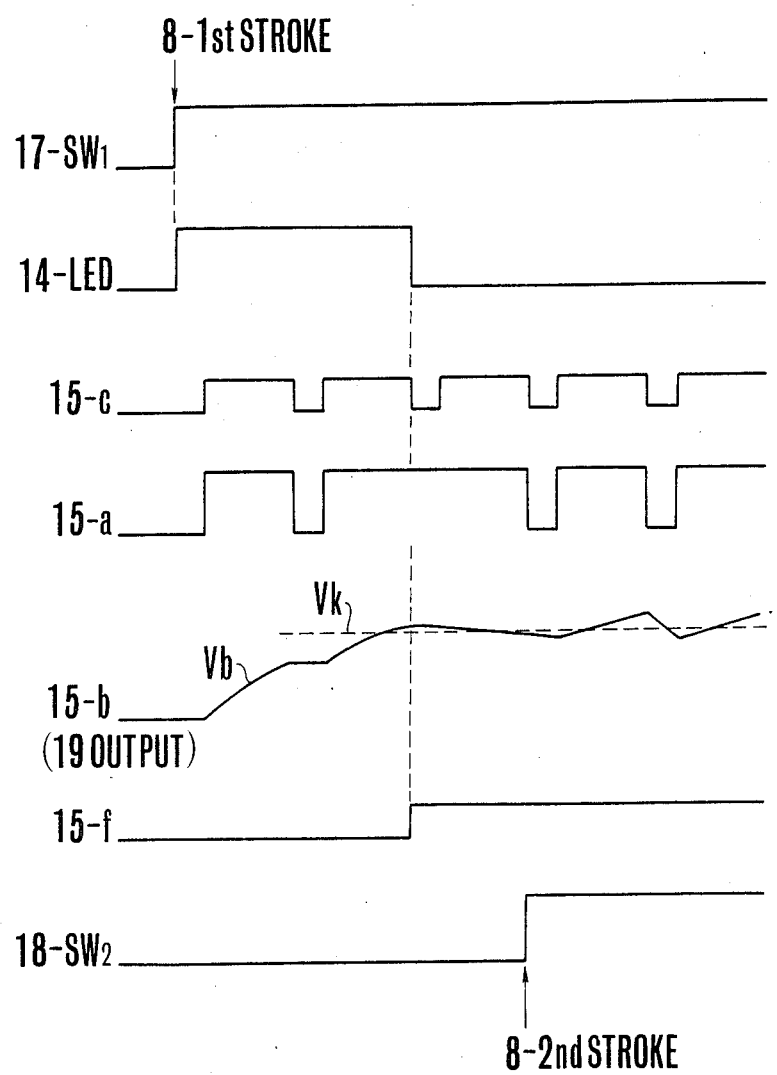

STILL VIDEO CAMERAS

This is a continuation of application Ser. No. 409,860, filed Aug. 20, 1982 and now abandoned.

BACKGROUND OF THE INVENTION

1. Field of the Invention

The present invention relates to still video cameras in which an image of an object formed on the image pick-up surface of an image pick-up device through a picture-taking lens is read out by vertical and horizontal scannings to obtain video signals. These signals are recorded on a magnetic disc.

2. Description of the Prior Art

Conventional still video cameras consist of an image pick-up portion in which an image of an object formed by a picture-taking lens on the image pick-up surface of a solid pick-up device, such as C.C.D., or a pick-up tube is vertically and horizontally scanned at a predetermined frequency to obtain field or frame video signals, and a recording portion in which the field or frame video signals are magnetically recorded. The recording operation in these conventional cameras is performed by operating a trigger switch, while observing the object image in the finder, to magnetically record the video signal corresponding to one field or one frame on one selected portion or one recording track on the rotary magnetic disc by a recording head. In conventional cameras, however, there is a problem that if the magnetic disc which is rotated by a motor etc. is not built up to a predetermined rotational speed at the time of signal recording, the recorded signals are not properly reproduced by a predetermined synchronizing rotation at the time of reproduction so that it is impossible to display in synchronization with the signal synchronizing with the vertical and horizontal scannings at the time of the recording. In order to solve the problem, a camera is proposed, in which the triggering operation of the camera is divided into two steps; in the first step rotation of the magnetic disc starts and in the second step recording of the video signals on the magnetic disc starts. This proposed camera also has the disadvantage that if an indication device is not provided in the finder etc., which can indicate that the magnetic disc has reached the predetermined rotational speed, it is impossible to know when the second step should be started.

The main object of the present invention is to provide a novel and useful still video camera which can completely eliminate the problems and disadvantages of the prior art.

Another object of the present invention is to provide an improved still video camera which can properly indicate when proper recording should begin.

Other objects and features of the present invention will be clear from the following description of the preferred embodiment of the present invention made with reference to the accompanying drawings.

SUMMARY OF THE INVENTION

In the still video camera according to the present invention with the above objects, when a driving means for driving the magnetic disc or a recording medium is started by the first camera operation and reaches a stable state, an indication means is changed from the first state to the second state indicating that the second camera operation may be performed.

A detection means may be provided for detecting that the driving means has reached a stable state and a control means may be provided for changing the indication means from the first state to the second state in response to the detection means. The indication means may be set at the first state by the first camera operation.

According to one embodiment of the present invention, an indication lamp is used as the indication means and is turned on in the first state and turned off in the second state. For example, the driving means contains a motor and the detection means is designed to detect whether the rotational speed of the motor has reached a stable rotation or a predetermined rotational speed. Furthermore, according to one embodiment of the present invention, the first and second camera operations are performed respectively in succession by the first stroke and the second stroke of the trigger operation means.

BRIEF DESCRIPTION OF THE DRAWINGS

FIG. 3 shows a timing chart of input and output wave forms in the main portion of the circuitry shown in FIG. 2.

DESCRIPTION OF THE PREFERRED EMBODIMENT

Figure 1A:
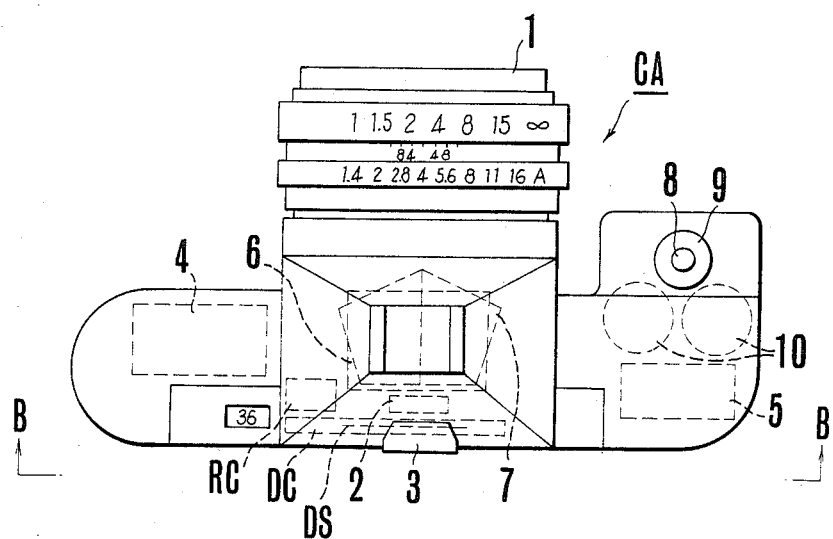
FIGS. 1A and 1B are respectively a plan view of a preferred embodiment of the still video camera according to the present invention and is a rear view along the line B—B in FIG. 1A.
Figure 1B:
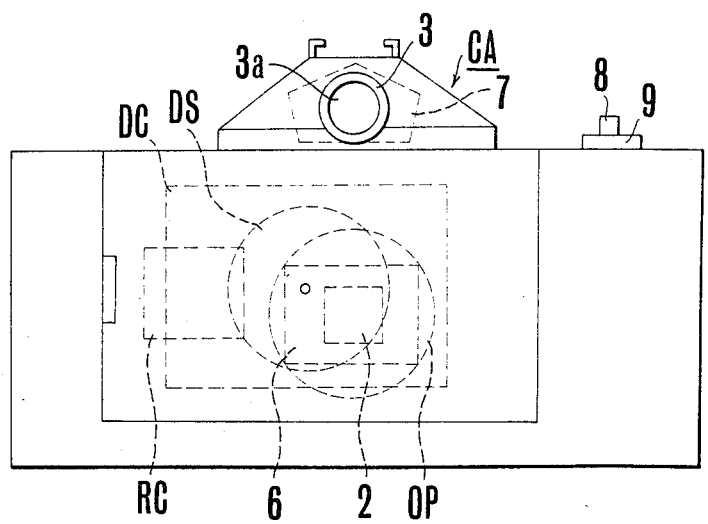

Referring to FIGS. 1A and 1B, there is shown a camera CA, a picture-taking lens 1, an image pick-up device 2 which is a solid image pick-up device, such as C.C.D. A finder 3 reflects the light from the picture-taking lens by a half-mirror 6 inclined at 45° and a pentaprism 7 and is projected through an eye-piece lens 3a (FIG. 1B). A known video processing circuit 4 processes the scanning signals from the image pick-up device 2 to form video signals. The apparatus includes a control circuit 5, a cassette DC contains a magnetic disc DS, a known recording device RC having a recording head, a trigger button 8, a mode switch 9, and a power source battery 10. In FIG. 1B a picture-taking (image forming) optical system is identified by the reference characters OP.

In the camera CA, the object image is formed on the image pick-up plane of the C.C.D. image pick-up device 2 through the optical system OP of the picture-taking lens 1, and at this time, the object image is observed through the eye-piece lens 3a of the finder 3 via the half-mirror 6 and the pentaprism 7. In this way, the object is located, and the trigger button 8 is depressed after the picture-taking lens 1 is focused on the object. Upon depression of the button 8, the scanning signals of the object images from the image pick-up device 2 are successively read out by the horizontal and vertical scannings under the control of a known drive circuit, and the read out signals are processed in the processing circuit 4 into video signals which are then recorded on the rotary magnetic disc DS in the cassette DC by the recording device RC.

Figure 2:
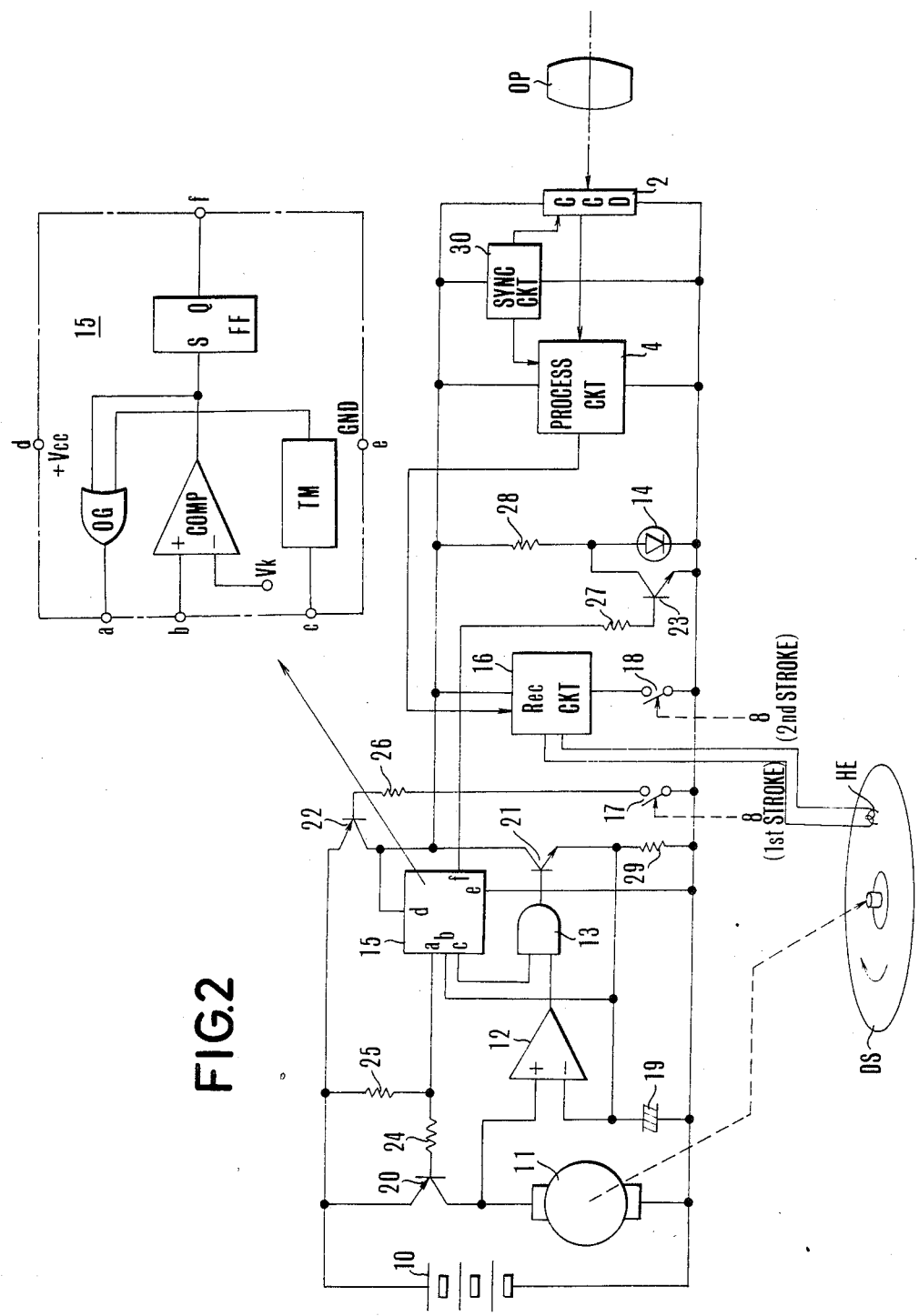
FIG. 2 is an electrical schematic of the still video camera shown in FIGS. 1A and 1B.

Referring to the circuit shown in FIG. 2, there is shown a power source battery 10 as mentioned before, a driving motor 11 for rotating the recording magnetic disc DS in the cassette DC. Reference numeral 12 identifies an operational amplifier, reference numeral 13 identifies an AND gate, reference numeral 14 identifies a light emitting diode (LED). The light emitting diode LED used as the indication means, is located at a position observable through the finder 3. The apparatus includes a control circuit 15, an image pick-up device 2 (CCD), a processing circuit 4, a synchronization signal generating circuit 30, a recording circuit 16 in the recording device RC mentioned before, a recording head HE (magnetic head), a switch 17 (SW1) which turns on with the first stroke of the trigger button 8, a switch 18 (SW2) turns on with the second stroke of the trigger button 8, a capacitor 19, transistors 20–23 and resistors 24–29.

The operation of the above circuit structure follows. When the switch 17 is turned on by the first stroke of the trigger button 8 in FIG. 1, the transistor 22 in the current supply circuit becomes conductive, and the operational amplifier 12, the control circuit 15, the image pick-up device 2, the synchronization signal generation circuit 30, and the video processing circuit 4 become operative, and simultaneously the LED 14 turns on in the finder 3. As shown in FIG. 3, when the switch 17 (SW1 in FIG. 3) is turned on, the signal as shown by 15c in FIG. 3 is generated at the output c of the control circuit 15, and the signal as shown by 15a in FIG. 3 is generated at the output a. Thus when the switch 17 turns on, the output c of the control circuit 15 is at a low level "L" and the output a is also at a low level "L", so that the transistor 20 in the motor driving circuit becomes conductive. When the transistor 20 becomes conductive, current is supplied to the motor 11 rotating it and the voltage generated by the rotation of the motor 11 is applied at this time to the non-inversion input of the operational amplifier 12. This voltage is in proportion to the rotational speed of the motor 11. Then as the output c becomes high level "H", the output a also becomes high level "H", and the transistor 20 becomes non-conductive cutting the power supply to the motor 11.

At the inversion input of the amplifier 12, the voltage of the capacitor 19 is given so that if the output voltage of the capacitor 19 is low, the output of the amplifier 12 becomes "H", and if the output c of the control circuit 15 is "H", the output of the AND gate 13 also becomes "H", hence the transistor 21 becomes conductive charging the capacitor 19 through the resistor 29. Thereby, the terminal voltage of the capacitor 19 is built up, as shown by 15b in FIG. 3, and the capacitor 19 is charged until the terminal voltage of the motor 11 becomes equal to the voltage of the capacitor 19, namely to a voltage proportional to the rotation speed of the motor 11. This voltage (Vb) of the capacitor 19 is applied to the input b of the control circuit 15, where the voltage Vb of the input b is compared with the standard voltage Vk, and when the voltage Vb becomes higher than the voltage V, the output a of the control circuit 15 becomes "H" making the transistor 20 non-conductive, thus cutting off the power supply to the motor 11 and reducing the rotational speed of the motor 11.

On the other hand, when the voltage Vb of the input b becomes higher than the standard voltage Vk, the output f of the control circuit is latched to "H", as shown by 15f in FIG. 3. When the output f becomes "H", the transistor 23 becomes conductive so that the LED 14, which turned on when the switch 17 turned on, now turns off. Thereby the completion of image recording preparation is now indicated. In this way, the magnetic disc DS is now rotating at a predetermined speed in a state suitable for picture recording, so that if the trigger button 8 is depressed at this point a second stroke turning on the switch 18, the recording circuit 16 is actuated and the video signal from the video processing circuit 4, corresponding to one field or frame, is recorded on a selected track of the magnetic disc DS through the head HE.

The details of the control circuit 15 are as shown in FIG. 2, in which reference characters TM identify a repetition timer which generates the output c (15c in FIG. 3), a comparator COMP compare the input b (15b in FIG. 3) with the standard voltage Vk, an OR gate OG receives the output of the timer TM and the output of the comparator COMP, the output of the gate OG becoming the above output a (15a in FIG. 3). A flip-flop circuit which FF is set by the change of the output of the comparator COMP from low to high and thereby changes its Q output to high. Thus the Q output of the flip-flop circuit FF becomes the above output f (15f in FIG. 3).

In the still video camera according to the present invention after operation of the driving means for the recording medium has been started by the first camera operation, the indication means indicates that the driving means has reached a predetermined stable state, so that it is possible to accurately tell when the second camera operation for starting the recording should begin and hence it is possible to obtain a proper still video recording.

In the above embodiment, the LED 14 is changed from on to off when the magnetic disc has reached a predetermined rotational speed. Needless to say, it is also possible to change over the LED 14 from off to on.

What I claim:

1. A still video recording camera for use with a rotary type record bearing medium, comprising:
    (a) an image pick-up element for producing an image signal representing a scan of an optical image;
    (b) a recording circuit including a recording head and for recording the image signal produced from said image pick-up element on the medium through the head;
    (c) a drive member for rotating the medium relative to the head;
    (d) a first control circuit for controlling said drive member so that the medium is maintained at a predetermined stable rotation state, said first control circuit producing a signal when the medium reaches said predetermined stable rotation state;
    (e) an indication member having first and second states; and
    (f) a second control circuit responsive to the signal produced from said first control circuit for causing said indication member to change its state from said first to said second state.

2. The camera according to claim 1, further comprising a manually operable actuation member for actuating said first control circuit, said second control circuit being responsive to said actuation member for setting said indication member at the first state.

3. The camera according to claim 2, wherein said indication member is light emissive and having light emitting and non-emitting states respectively corresponding to said first and second states.

4. The camera according to claim 2 or 3, further comprising a drive circuit responsive to said actuation member for driving said image pick-up element.

5. The camera according to claim 1, wherein said indication member is light emissive and having light emitting and non-emitting states respectively corresponding to said first and second states.

6. The camera according to claim 1, further comprising:
   a manually operable first actuation member for actuating said first control circuit; and
   a manually operable second actuation member for actuating said recording circuit,
   said second control circuit being responsive to said first actuation member for setting said indication member at the first state.

7. The camera according to claim 6, wherein said indication member is light emissive and having light emitting and non-emitting states respectively corresponding to said first and second states.

8. The camera according to claim 6 or 7, further comprising a drive circuit responsive to said first actuation member for driving said image pick-up element.

9. A video recording camera for use with a record bearing medium, comprising:
   (a) an image pick-up element for producing an image signal representing a scan of an optical image;
   (b) a recording circuit including a recording head and for recording the image signal produced from said image pick-up element on the medium through the head;
   (c) a drive motor for relatively rotating the medium and the head;
   (d) a first control circuit for controlling said drive motor so that the motor is maintained at a predetermined stable rotation state, said first control circuit producing a signal when the motor reaches said predetermined stable rotation state;
   (e) an indication member having first and second states; and
   (f) a second control circuit responsive to the signal produced from said first control circuit for causing said indication member to change its state from said first to said second state.

10. The camera according to claim 9, further comprising a manually operable actuation member for actuating said first control circuit, said second control circuit being responsive to said actuation member for setting said indication member at the first state.

11. The camera according to claim 10, wherein said indication member is light emissive and having light emitting and non-emitting states respectively corresponding to said first and second states.

12. The camera according to claim 10 or 11, further comprising a drive circuit responsive to said actuation member for driving said image pick-up element.

13. The camera according to claim 9, wherein said indication member is light emissive and having light emitting and non-emitting states respectively corresponding to said first and second states.

14. The camera according to claim 9, further comprising:
   a manually operable first actuation member for actuating said first control circuit; and
   a manually operable second actuation member for actuating said recording circuit,
   said second control circuit being responsive to said first actuation member for setting said indication member at the first state.

15. The camera according to claim 14, wherein said indication member is light emissive and having light emitting and non-emitting states respectively corresponding to said first and second states.

16. The camera according to claim 14 or 15, further comprising a drive circuit responsive to said first actuation member for driving said image pick-up element.

17. The camera according to claim 16, wherein said first and second actuation members are arranged to be manually operable in the named order.

18. The camera according to claim 14 or 15, wherein said first and second actuation members are arranged to be manually operable in the named order.

19. A still video recording camera for use with a magnetic disc, comprising:
   (a) an image pick-up element for producing an image signal representing a scan of an optical image;
   (b) a recording circuit including a magnetic recording head and for recording the image signal produced from said image pick-up element on the disc through the head;
   (c) a motor for rotating the disc relative to the head;
   (d) a motor control circuit for controlling said motor so that the disc is maintained at a predetermined stable rotation state, said motor control circuit producing a signal when the disc reaches said predetermined stable rotation state; and
   (e) means responsive to the signal produced from said motor control circuit, said responsive means producing an output which has first and second states and changing the output from the first to the second state in response to said signal produced from the motor control circuit.

20. The camera according to claim 19, further comprising a manually operable actuation member for actuating said motor control circuit, said responsive means being further responsive to said actuation member for setting the output thereof at the first state.

21. The camera according to claim 20, further comprising a drive circuit responsive to said actuation member for driving said image pick-up element.

22. The camera according to claim 19, 20 or 21, further comprising a viewfinder, said responsive means including an indication member which is light emissive and has lght emitting and non-emitting states respectively corresponding to one of said first and second states, said indication member being disposed so that its light emitting and non-emitting states are recognizable through said viewfinder.

23. A still video recording camera for use with a rotary magnetic disc, comprising:
   (a) an image pick-up element for producing an image signal representing a scan of an optical image;
   (b) a recording circuit including a magnetic recording head and for recording the image signal produced from said image pick-up element on the disc through the head;
   (c) a motor for rotating the disc relative to the head;
   (d) a motor control circuit for controlling said motor so that the disc is maintained at a predetermined stable rotation state, said motor control circuit producing a signal when the disc reaches said predetermined stable rotation state;
   (e) a manually operable first actuation member for actuating said first control circuit;
   (f) a manually operable second actuation member for actuating said recording circuit; and
   (g) means responsive to said first actuation member and to the signal produced from said motor control circuit, said responsive means producing an output which has first and second states and setting the output at the first state in response to the first actuation member while changing the output from the first state to the state in response to said signal produced from the motor control circuit.

24. The camera according to claim 23, further comprising a viewfinder, said responsive means including an indication member which is light emissive and has light emitting and non-emitting states respectively corresponding to one of said first and second states, said indication member being disposed so that its light emitting and non-emitting states are recognizable through said viewfinder.

25. The camera according to claim 23, further comprising a drive circuit responsive to said first actuation member for driving said image pick-up element.

26. The camera according to claim 23, 24 or 25, further comprising an operation member for operating said first and said second actuation members in the named order.

* * * * *